United States Patent [19]

Newnes

[11] Patent Number: 5,795,126
[45] Date of Patent: Aug. 18, 1998

[54] TILT HOIST WITH MULTIPLE INDEPENDENT ROTATABLE MASTS

[75] Inventor: William R. Newnes, Salmon Arm, Canada

[73] Assignee: Newnes Machine Ltd., Salmon Arm, Canada

[21] Appl. No.: 822,621

[22] Filed: Mar. 20, 1997

Related U.S. Application Data

[60] Provisional application No. 60/013,802, Mar. 21, 1996.

[51] Int. Cl.[6] ............................................. B65G 59/02
[52] U.S. Cl. .................. 414/796.7; 414/796.2; 414/924
[58] Field of Search .................. 414/796.7, 796.2, 414/795.8, 795.9, 790.8, 924

[56] References Cited

U.S. PATENT DOCUMENTS

| | | | |
|---|---|---|---|
| 1,272,472 | 7/1918 | Lohman | 414/796.2 |
| 3,018,008 | 1/1962 | Eger et al. | 414/924 |
| 3,203,560 | 8/1965 | Janzer | 414/924 |
| 3,521,763 | 7/1970 | Heide et al. | 414/796.7 |
| 3,565,266 | 2/1971 | Buss | 414/796.7 |
| 4,640,655 | 2/1987 | Jacobsen | 414/119 |
| 4,710,089 | 12/1987 | Schneider | 414/796.7 |
| 4,838,748 | 6/1989 | Johnson | 414/796.7 |
| 5,249,915 | 10/1993 | Ritola | 414/796.7 |

Primary Examiner—Karen M. Young
Assistant Examiner—Douglas Hess
Attorney, Agent, or Firm—Antony C. Edwards

[57] ABSTRACT

A tilt hoist for breaking down a lumber stack has an inclined face such that a lumber stack may be translated by sliding upwards over the inclined face. The tilt hoist includes a plurality of tilt masts having translatable hoist arms for receiving the lumber stack from a stack transfer device such as an infeed chain. The tilt masts and corresponding hoist arms are pivotally mounted to the support frame at the pivot points located at the bottom of the tilt masts. A selected first group of tilt masts (the number depending on the tiered material length) are rotated into a stack receiving position where the hoist arms engage the underside of a first lumber stack which has been advanced by an infeed chain to a stack transfer position. The selected first group of tilt masts and corresponding hoist arms are rotated back, lifting the first lumber stack and positioning the first lumber stack into slidable engagement on the inclined face, that is, so that the first lumber stack lies flush on its side on the inclined face. The hoist arms translate the first lumber stack by sliding the stack upwards over the inclined face in a direction towards and over the shear point of the inclined face. Immediately after discharging the first lumber stack, the first group of tilt masts and corresponding hoist arms are rotated downwards to a recessed position where they are recessed beneath the inclined face so as to allow a second, subsequent, lumber stack to pass over.

4 Claims, 8 Drawing Sheets

TILT HOIST WITH MULTIPLE INDEPENDENT ROTATABLE MASTS

This application claims the benefit of U.S. Provisional application Ser. No. 69/013,802 filed on Mar. 21, 1996.

FIELD OF THE INVENTION

This invention relates to an apparatus for breaking down stacked, or stacked and stickered rough lumber, and in particular relates to an apparatus capable of constantly feeding and breaking down stacked and stickered rough lumber by the interaction of a plurality of tiltable hoisting masts.

BACKGROUND OF THE INVENTION

It is known in the art to breakdown a stack of stacked and stickered lumber (hereinafter referred to as a lumber stack) arriving on an infeed transfer chain by placing the lumber stack on a rotatable hoist frame which may be rotated to incline the entire lumber stack. The lumber stack is pushed by support arms up the inclined surface formed by the inclined hoist frame so as to discharge under the force of gravity rows or tiers of individual pieces of lumber from the top of the lumber stack, as the top of the lumber stack is pushed beyond the uppermost end of the frame.

It is also known to assist pushing the lumber stack towards the uppermost end of the frame so as to discharge tiers of lumber from the stack by providing secondary lumber stack support arms which at some intermediate transfer point take over the upward translation of the lumber stack from the primary lumber stack support arms on the rotatable frame.

In particular, applicant is aware of U.S. Pat. No. 4,838,748 which issued on Jun. 13, 1989 to Johnson for a device entitled "Hoist and Accumulator Arm Apparatus". Johnson teaches a rotatable hoist frame for rotating a lumber stack, from an upright position into an inclined position flush with an accumulator arm apparatus. Hoist frame horizontal support members translate up the incline to slide the load of tiered material upwards onto a similarly inclined frame surface on the accumulator arm apparatus. Retracted accumulator arms in the accumulator arm apparatus extend from the accumulator arm apparatus normal to the inclined frame surface once the load of tiered material has been slid from the hoist frame onto the accumulator arm apparatus. The accumulator arms take the place of the hoist frame horizontal supports and slide the lumber stack further upwards to a discharge point at the uppermost edge of the accumulator arm apparatus. The accumulator arms then retract and are repositioned ready to accept the next lumber stack which has been transferred onto the hoist frame, rotated, and translated onto the accumulator arm apparatus.

It is also known in the industry that some long loads of lumber (particularly long thin lumber) can hang up on the unsupported end causing the lumber to come off the tilt hoist skewed and then bunched up, where the operator would then have to shut down the tilt hoist and the outfeed transfer and then unscramble the lumber by hand before restarting the outfeed transfer and tilt hoist.

Thus, it is an object of the present invention to provide a breakdown hoist which may be relatively quickly cycled so that delivery of lumber from lumber stacks, which have been broken down, approaches a constant supply rate onto an outfeed transfer device, and incidental to this it is an object to provide an apparatus which does not require the rotation or tilting of the entire hoist frame. It is another object to provide a breakdown hoist which reduces the probability of

2 stacking sticks falling inside the hoist frame. It is a further object to provide a breakdown hoist with an automatically adjustable shear point that will assist the clearing of the ends of long bowed or drooping lumber stacks at the shear point. It is still another object of the invention to allow only a selected group of tilt masts to operate when breaking down shorter lengths of lumber stacks thus saving power, and wear and tear on the apparatus.

SUMMARY OF THE INVENTION

A tilt hoist for breaking down a lumber stack has an inclined face such that a lumber stack may be translated by sliding upwards over the inclined face. The tilt hoist includes a plurality of tilt masts having translatable hoist arms for receiving the lumber stack from a stack transfer device such as an infeed chain. A supporting frame supports the inclined face and an automatically adjustable discharge point, (hereinafter referred to as a shear point). The support frame also supports the tilt mast's radial pivot points. The inclined face includes sheeting in between the tilt masts.

The tilt masts and corresponding hoist arms are pivotally mounted to the support frame at the pivot points located at the bottom of the tilt masts. A selected first group of tilt masts (the number depending on the tiered material length) are rotated into a stack receiving position where the hoist arms engage the underside of a first lumber stack which has been advanced by an infeed chain to a stack transfer position. The selected first group of tilt masts and corresponding hoist arms are rotated back, lifting the first lumber stack and positioning the first lumber stack into slidable engagement on the inclined face, that is, so that the first lumber stack lies flush on its side on the inclined face.

The hoist arms translate the first lumber stack by sliding the stack upwards over the inclined face in a direction towards and over the shear point of the inclined face. As the last portion of the first lumber stack is being translated up the inclined surface and deposited over the shear point and onto the outfeed transfer device, a second lumber stack is being received from the infeed transfer chains ready for tilting back onto, and sliding over, the inclined face on a second group of tilts masts and corresponding hoist arms. Immediately after discharging the first lumber stack, the first group tilt masts and corresponding hoist arms are rotated downwards to a recessed position where they are recessed beneath the inclined face so as to allow the second, subsequent, lumber stack to pass over the recessed first group of tilt masts as the second lumber stack is translated on the second group of tilt masts and their corresponding hoist arms to the shear point for breakdown.

As the second lumber stack is raised and broken down over the shear point, it is reduced in size and advanced up the inclined face. This allows the first group of tilt masts to be rotated up from the retracted position below the second lumber stack and passed through the inclined face. The first group of tilt masts is thus returned to the upright stack receiving position, where the next subsequent lumber stack is advanced by the infeed chains, up to abut the upright tilt masts over top of the hoist arms which have been lowered as the tilt masts are rotated to the upright. The lumber stack is then rotated back to the inclined face, to be translated over the inclined face towards the shear point of the inclined face for discharge. This subsequent lumber stack is raised up the inclined face to just below the partial previous lumber stack and moves along below the partial lumber stack until the partial lumber stack is fully discharged and its corresponding group of tilt masts and hoist arms retract below the inclined face. This allows the subsequent lumber stack to be translated up the inclined face, where the lumber stack begins to breakdown as it reaches the shear point. The lumber stack is thus deposited over the shear point of the inclined face onto the outfeed transfer device.

One end of the shear point may be equipped with a photosensor that detects any bowed or drooping longer unsupported lumber pieces at the shear point and automatically lowers that end of the shear point to clear the drooping lumber ends for unobstructed discharge.

In summary, the tilt hoist for breaking down lumber stacks of the present invention may be described as including an inclined planar sheeted surface, first and second inclinable hoisting members or selected groups of hoisting members and corresponding hoisting arms. The first and second inclinable hoisting members are independently selectively inclinable between a vertical lumber stack receiving position and first and second inclined positions, wherein the first inclined position is generally coplanar with the inclined planar sheeted surface, and wherein the second inclined position is below the first inclined position. A first hoisting arm extends generally perpendicularly from, and is selectively positionable along, the first inclinable hoisting member. A second hoisting arm extends generally perpendicularly from, and is selectively positionable along, the second inclinable hoisting member.

When the first inclinable hoisting member is in the vertical lumber stack receiving position, the first hoisting arm is positioned for receiving a first stack of lumber thereon. The first hoisting arm is selectively positionable upwards to translate the first stack of lumber over the inclined planar sheeted surface when the first hoisting member is inclined from the vertical lumber stack receiving position to the first inclined position whereby as the first lumber stack is translated upwards over the inclined planar sheeted surface, consecutive tiers of the first stack of lumber may be discharged from an upper edge of the inclined planar sheeted surface.

When the second inclinable hoisting member is in the vertical lumber stack receiving position, the second hoisting arm is positioned for receiving a second stack of lumber thereon. The second hoisting arm is selectively positionable upwards to translate the second stack of lumber over the inclined planar sheeted surface when the second hoisting member is inclined from the vertical lumber stack receiving position to the second inclined position whereby as the second lumber stack is translated upwards over the inclined planar sheeted surface, consecutive tiers of the second stack of lumber may be discharged from an upper edge of the inclined planar sheeted surface.

The first and second stacks of lumber may be sequentially discharged from the upper edge of the inclined planar sheeted surface when the first and second inclinable hoisting members are alternating inclined from the vertical lumber stack receiving position to the first inclined position for alternating selectively positionable upwards translation of the first and second lumber stacks on the first and second hoisting arms respectively.

The first and second inclinable hoisting members are alternatingly inclinable from the first inclined position to the second inclined position whereby the first and second hoisting arms may be selectively translated in a downwards direction along the first and second inclinable hoisting members respectively.

Advantageously the first and second inclinable hoisting members are independently selectively inclinable about a common pivot axis and the common pivot axis may be a common axle extending along a lower edge of said inclined planar sheeted surface.

Further advantageously the upper edge of the inclined planar sheeted surface includes a selectively lowerable portion along an end of the upper edge of the inclined planar sheeted surface.

DETAILED DESCRIPTION OF THE PREFERRED EMBODIMENT

Figure 1:
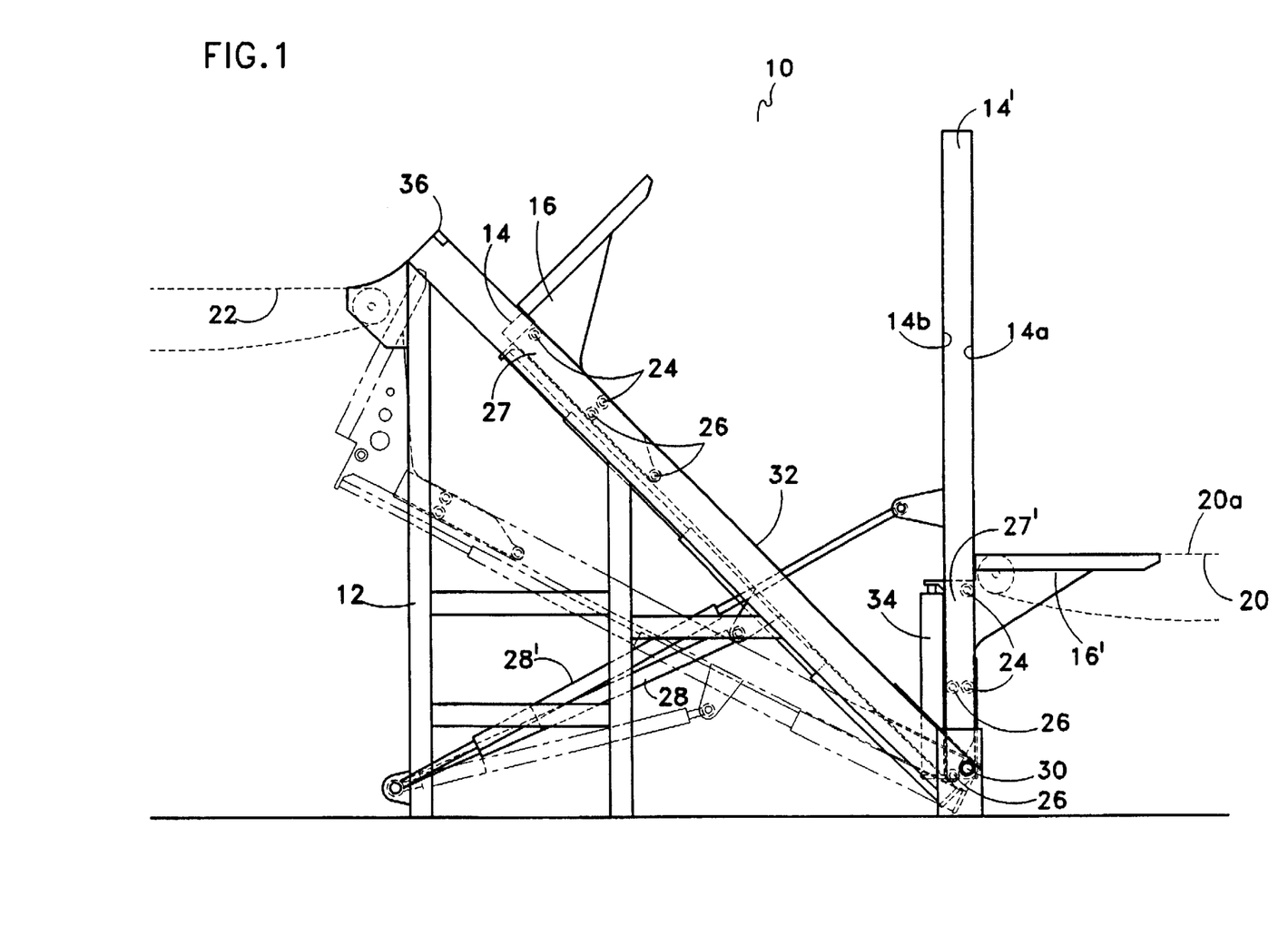
FIG. 1 is a left side view of the tilt hoist showing the two groups of tilt masts and hoist arms in their two operating positions. A retracted position is shown in dotted outline.
Figure 2:
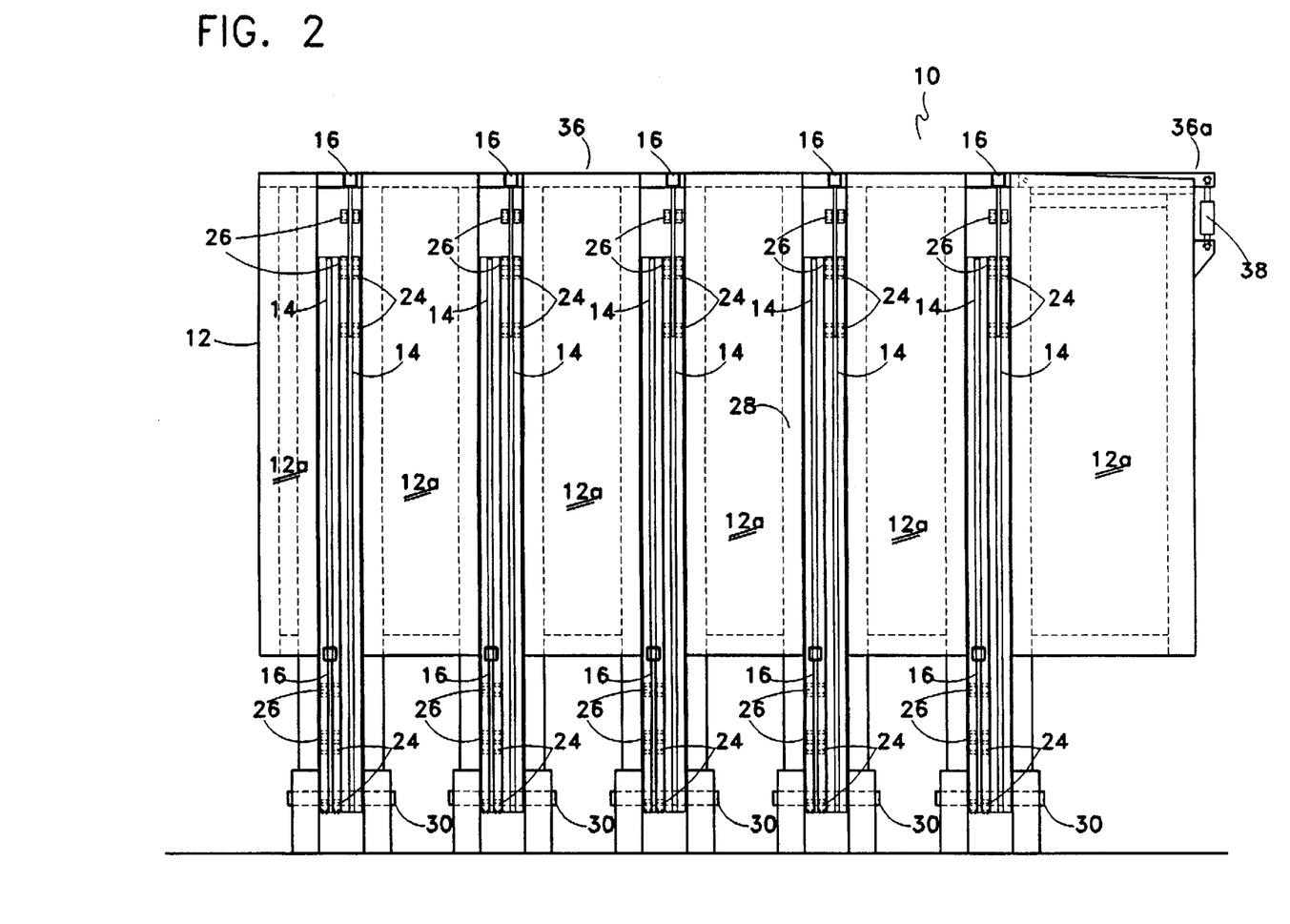
FIG. 2 is a front overhead view of the tilt hoist, perpendicular to the inclined face.
Figure 3:
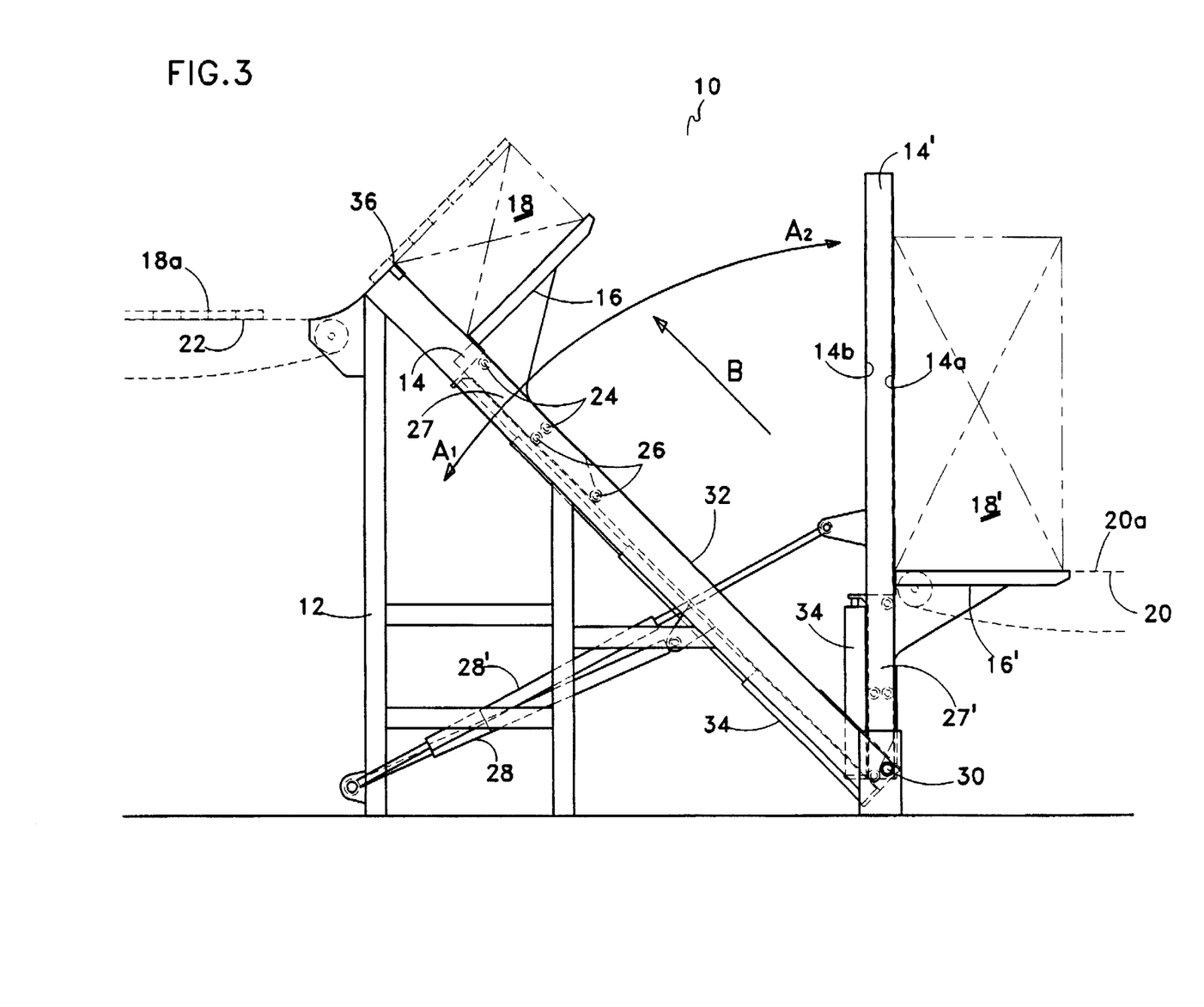
FIG. 3 is a left side elevation view of the tilt hoist with one group of tilt masts upright receiving a lumber stack, and the second group of tilt masts in-line with the inclined face and with hoist arms hoisting and discharging a partial lumber stack.
Figure 4:
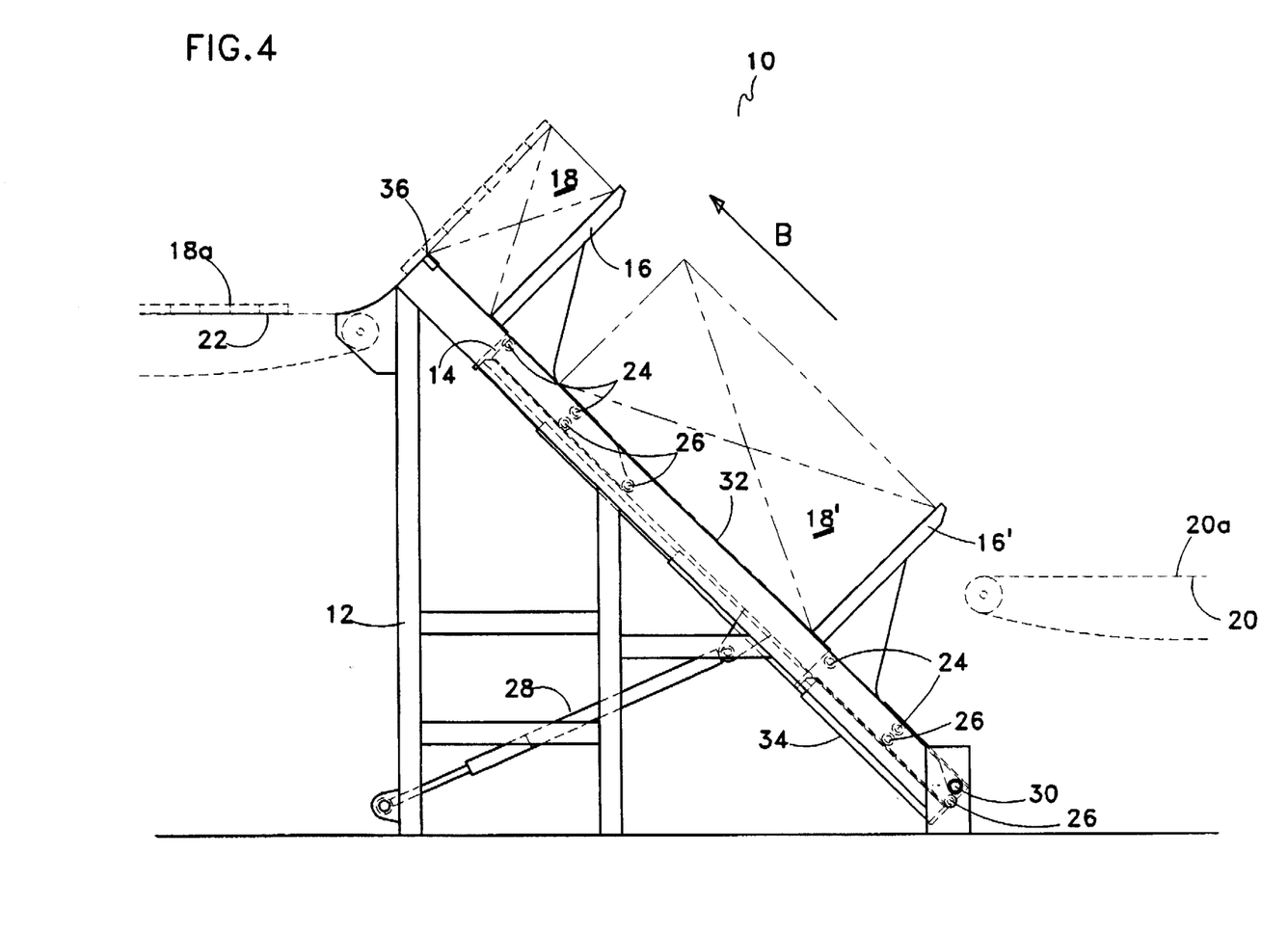
FIG. 4 is a left side elevation view of the tilt hoist, with one group of tilt masts having received a lumber stack, and tilted back to the inclined face, and the second group of tilt masts inclined with hoist arms discharging lumber.

Referring to the drawing figures wherein similar characters of reference represent corresponding parts in each view, the tilt hoist of the present invention is generally indicated by the reference numeral 10. As seen in FIGS. 1 and 2, tilt hoist 10 includes a support frame constructed of various vertical and horizontal structural members 12, including inclined face sheeting 12a. A plurality of tilt masts 14 include hoist arms 16 for receiving lumber stacks 18. As seen in FIG. 3, lumber stacks 18 are delivered via infeed transfer chains 20. Infeed transfer chains 20 are supported by an infeed transfer frame (not shown). It is the purpose of tilt hoist 10 to break down lumber stacks 18 into individual pieces of lumber 18a. Individual pieces of lumber 18a are transported away from tilt hoist 10 on outfeed transfer chains 22. Outfeed transfer chains 22 are supported by an outfeed transfer frame (not shown).

Figure 8:
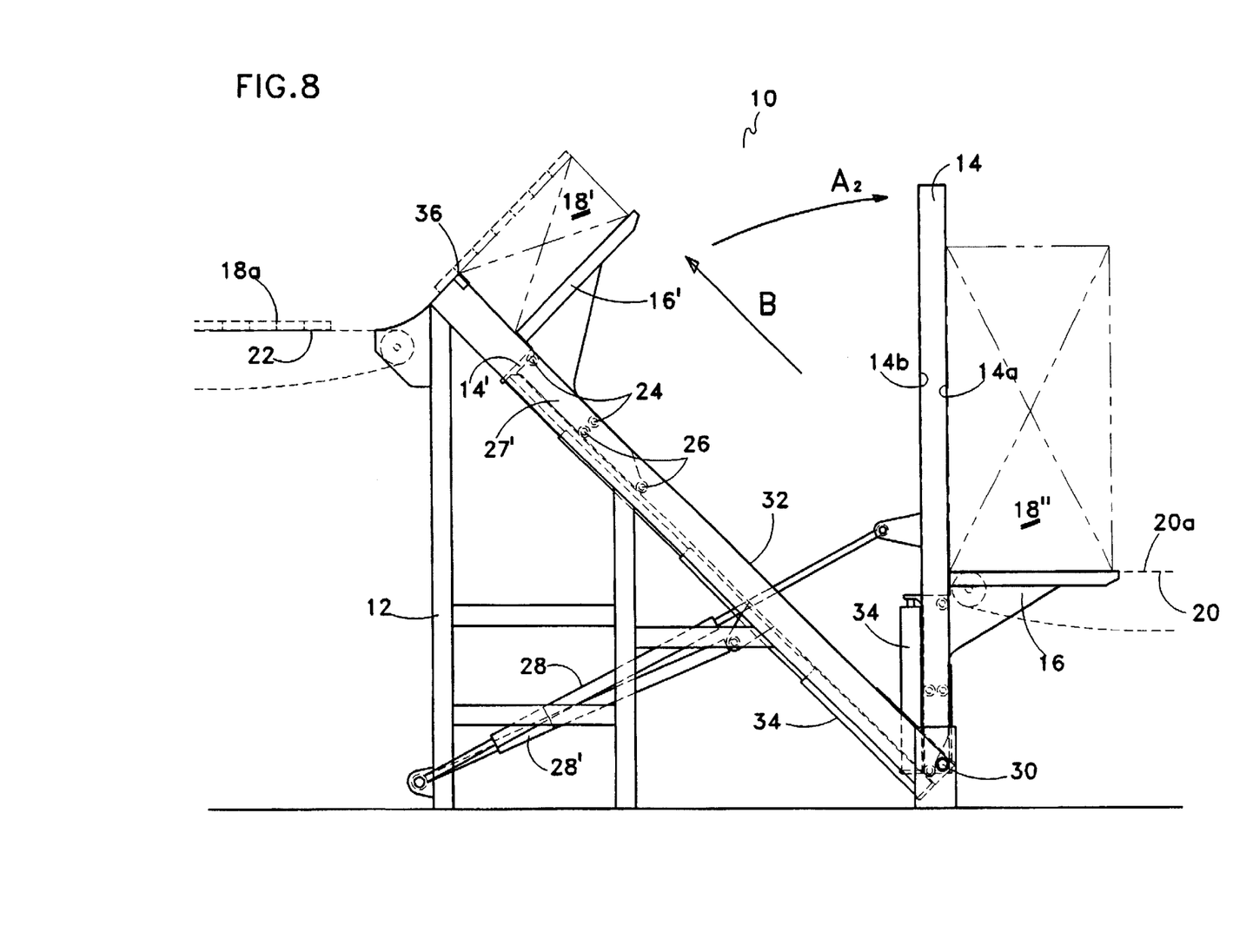
FIG. 8 is a left side elevation view of the tilt hoist, with one group of tilt masts upright receiving a lumber stack, and the second group of tilt masts inclined, with hoist arms hoisting and discharging a partial stack of tiered lumber as the cycle repeats.

Hoist arms 16 include opposed front rollers 24 and opposed rear rollers 26, although it is understood that other slide means may be used. Hoist arms 16 are slidably mounted on tilt masts 14. Front rollers 24 and rear rollers 26 on carriage 27 (shown in dotted outline) contact roller tracks 14a and 14b within tilt masts 14. Tilt masts 14 may be hydraulically actuated by hydraulic rams 28 so as to pivot corresponding tilt masts 14 about tilt mast pivot point 30. Tilt masts 14 may thereby be rotated to an inclined position from an upright position. In the upright position hoist arms 16 are horizontal, and when lowered, are in a lumber stack receiving position, as illustrated in FIGS. 1, 3 and 8. Infeed transfer chains 20 are arranged in proximity to tilt hoist 10 so that the lumber stack engaging surfaces 20a of infeed transfer chains are substantially aligned with the surfaces of hoist arms 16 when tilt masts 14 are in the upright stack receiving position. Infeed transfer chains 20 may thus transfer lumber stack 18 in over hoist arms 16 so as to abut lumber stack 18 against tilt masts 14 when tilt masts 14 are in the upright stack receiving position.

Once lumber stack 18 is transferred from infeed transfer chains 20 on to a first set of hoist arms 16, corresponding hydraulic ram 28 is actuated to rotate tilt masts 14 in direction "$A_1$", about pivot point 30 on support frame 12. Hydraulic ram 28 is pivotally connected at both ends. Once tiered lumber stack 18 is rotated back against inclined face 32, hydraulic ram 34 (or other hoisting means, such as chain, or cable, or ball screws) may be actuated to translate hoist arms 16 in direction "B" along tilt masts 14. Hydraulic ram 34 is rigidly connected at both ends. As lumber stack 18 is translated over shear point 36, hydraulic ram 38 may be actuated to lower adjustable shear point 36a if needed to help discharge any long unsupported bowed ends of the lumber in lumber stack 18 over the uppermost edge of sheeting 12a.

Figure 5:
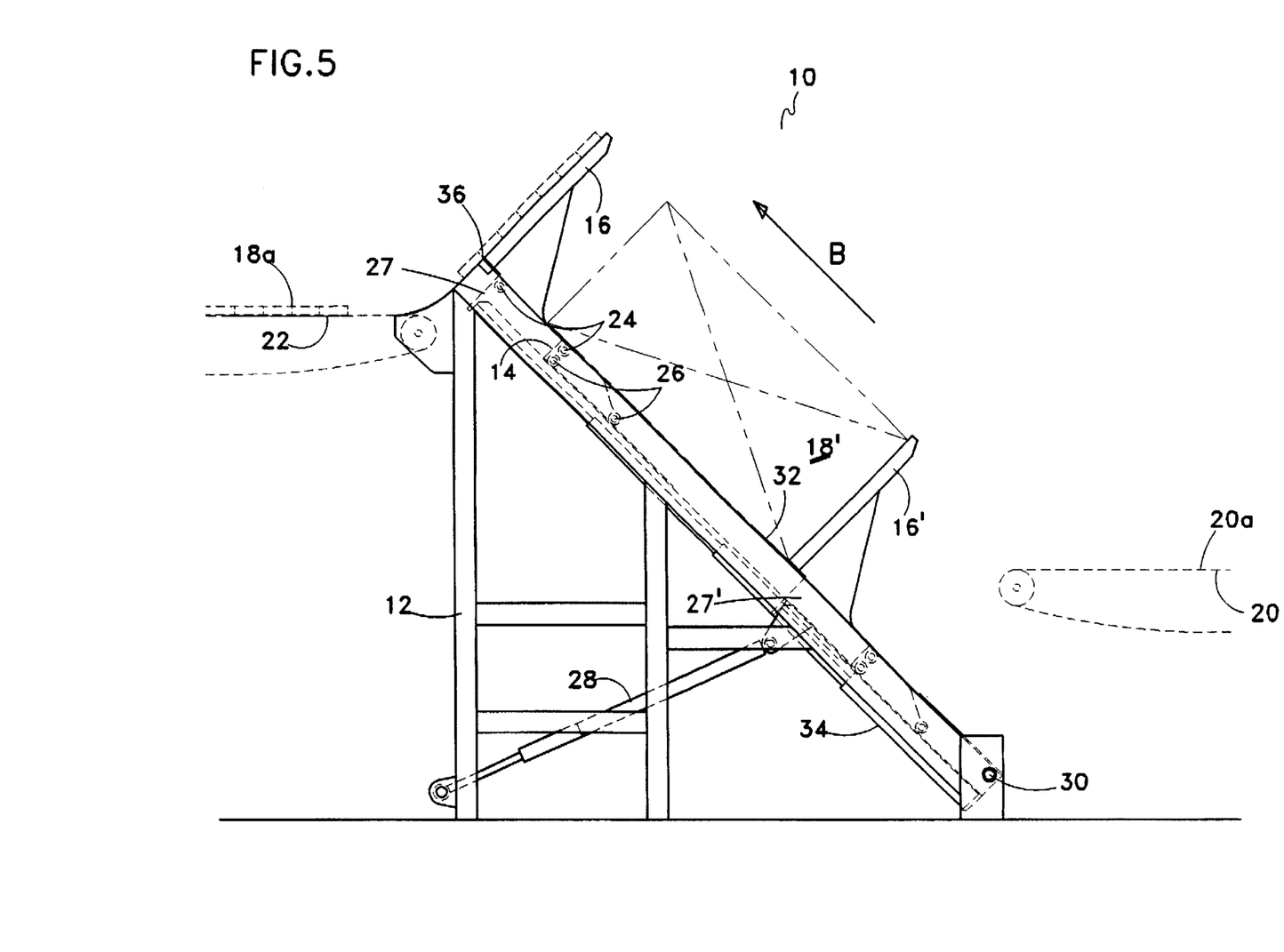
FIG. 5 is a left side elevation view of the tilt hoist, with one group of tilt masts tilted back to the inclined face and hoisting a lumber stack, and the second group of tilt masts inclined with hoist arms discharging a last tier of lumber.
Figure 6:
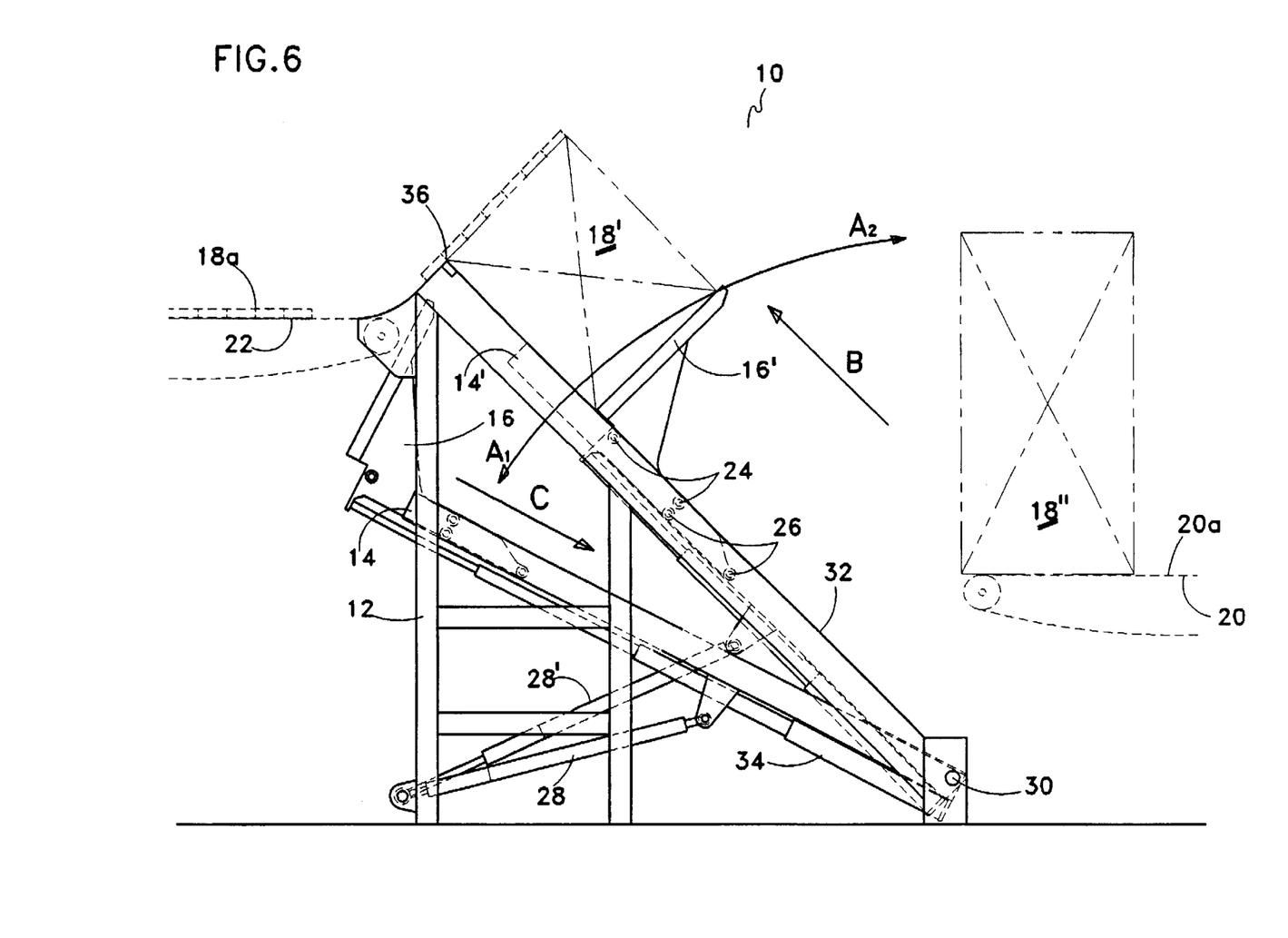
FIG. 6 is a left side elevation view of the tilt hoist, with one group of tilt masts tilted back to the inclined face and hoisting and discharging a lumber stack, and the second group of tilt masts retracted below the inclined face.
Figure 7:
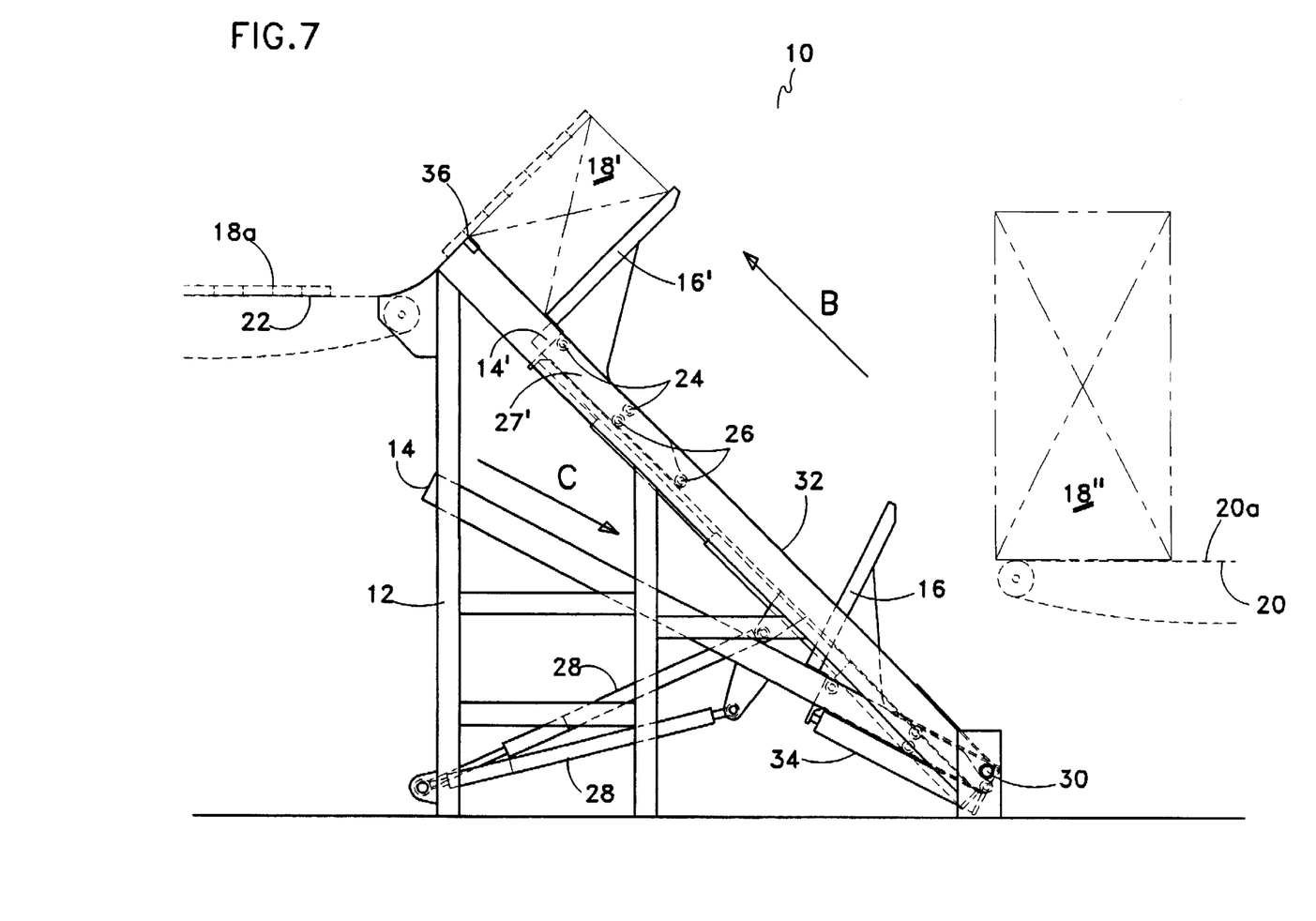
FIG. 7 is a left side elevation view of the tilt hoist, with one group of tilt masts tilted back to the inclined face and hoisting and discharging a lumber stack, and the second group of tilt masts retracted below the incline face, with hoist arms lowered.

A complete hoisting cycle is illustrated in FIGS. 3–8. A first lumber stack 18 is translated up inclined face 32 on hoist arms 16 and discharged over shear point 36. As the first lumber stack 18 is being discharged a second lumber stack 18' is being hoisted on a second set of tilt masts 14' and hoist arms 16'. Tilt masts 14' are tilted by actuation of hydraulic ram 28'. Once the first lumber stack 18 has been completely discharged, by the hoisting of carriage 27 partly beyond the upper end of tilt mast 14 as seen in FIG. 5, hydraulic ram 28 may be again actuated to rotate tilt masts 14 further in direction "$A_1$", retracting tilt masts 14 and hoist arms 16 behind and below inclined face 32, whereupon hydraulic ram 34 may be actuated to translate hoist arms 16 in direction "C", that is, to lower hoist arms 16 along tilt masts 14. Once lumber stack 18' on hoist arms 16' is translated farther up inclined face 32, as best seen in FIG. 7, hoist arms 16 are further lowered by hydraulic ram 34 in direction "C" along tilt masts 14, whereupon tilt masts 14 and hoist arms 16 are tilted up in direction $A_2$ by hydraulic ram 28, to return hoist masts 14 to the upright position and position hoist arms 16 for receiving the next tiered lumber stack 18" which has been advanced to the stack transfer position on the infeed transfer chains 20. The cycle then repeats.

Tilt hoist 10 may raise a lumber stack 18 slightly unevenly up to shear point 36 due to chain or cable stretch, or hydraulic leakage. Thus it may be required that there be a photosensor to detect the load level, and a control system to adjust the load level. The means of levelling the load depend on whether the lift means is of cable (or chain), or hydraulic cylinders. If cable (or chain) is being used then a hydraulic cylinder may be positioned to push on, or release the cable, thus lengthening or shortening the cable to adjust the level. If a hydraulic hoisting system is being used then an additional injection of hydraulic fluid via an additional valving system (or other means) could be used. Adjustable shear point 36a may be used in conjunction with this active load levelling system.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A tilt hoist for breaking down lumber stacks comprising:

an inclined planar sheeted surface;

first and second inclinable hoisting members, said first and second inclinable hoisting members independently selectively inclinable between a vertical lumber stack receiving position and first and second inclined positions, wherein said first inclined position is generally coplanar with said inclined planar sheeted surface, and wherein said second inclined position is below said first inclined position;

a first hoisting arm extending generally perpendicularly from, and selectively positionable along, said first inclinable hoisting member, said first hoisting arm for receiving a first stack of lumber thereon when said first inclinable hoisting member is in said vertical lumber stack receiving position and for selectively positionable upwards translation of said first stack of lumber over said inclined planar sheeted surface when said first inclined hoisting member is in said first inclined position, whereby consecutive tiers of said first stack of lumber may be discharged from an upper edge of said inclined planar sheeted surface;

a second hoisting arm extending generally perpendicularly from, and selectively positionable along said second inclinable hoisting member, said second hoisting arm for receiving a second stack of lumber thereon when said second inclined hoisting member is in said vertical lumber stack receiving position and for selectively positionable upwards translation of said second stack of lumber over said inclined planar sheeted surface when said second inclined hoisting member is in said first inclined position, whereby consecutive tiers of said second stack of lumber may be discharged from said upper edge of said inclined planar sheeted surface, whereby said first and second stacks of lumber may be sequentially discharged from said upper edge of said inclined planar sheeted surface when said first and second inclinable hoisting members are alternatingly inclined to said first inclined positions for said selectively positionable upwards translation of said first and second lumber stacks on said first and second hoisting arms respectively, and wherein said first and second inclinable hoisting members are alternatingly inclinable to said second inclined position, whereby said first and second hoisting arms may be selectively positioned in a downwards direction along said first and second inclinable hoisting members respectively beneath said second and first hoisting arms respectively.

2. The tilt hoist of claim 1 wherein said first and second inclinable hoisting members are independently selectively inclinable about a common pivot axis.

3. The tilt hoist of claim 2 wherein said common pivot axis is an axle extending along a lower edge of said inclined planar sheeted surface.

4. The tilt hoist of claim 1 wherein said upper edge of said inclined planar sheeted surface comprises a selectively lowerable portion along an end of said upper edge of said inclined planar sheeted surface.

* * * * *